United States Patent
Shetye

(10) Patent No.: US 10,032,116 B2
(45) Date of Patent: Jul. 24, 2018

(54) IDENTIFYING COMPUTER DEVICES BASED ON MACHINE EFFECTIVE SPEED CALIBRATION

(71) Applicant: CA, Inc., New York, NY (US)

(72) Inventor: Atmaram Shetye, Mapusa (IN)

(73) Assignee: CA, Inc., New York, NY (US)

( * ) Notice: Subject to any disclaimer, the term of this patent is extended or adjusted under 35 U.S.C. 154(b) by 121 days.

(21) Appl. No.: 15/202,216

(22) Filed: Jul. 5, 2016

(65) Prior Publication Data

US 2018/0012134 A1    Jan. 11, 2018

(51) Int. Cl.
*G06N 7/00* (2006.01)
*H04L 29/06* (2006.01)

(52) U.S. Cl.
CPC ......... *G06N 7/005* (2013.01); *H04L 63/0876* (2013.01); *H04L 63/102* (2013.01)

(58) Field of Classification Search
CPC .... G06N 7/005; H04L 63/0876; H04L 63/102
See application file for complete search history.

(56) References Cited

U.S. PATENT DOCUMENTS

| | | | | |
|---|---|---|---|---|
| 8,438,184 | B1* | 5/2013 | Wang | H04L 67/02 707/780 |
| 9,052,931 | B2* | 6/2015 | Sama | G06F 21/00 |
| 9,355,155 | B1* | 5/2016 | Cassel | G06F 21/552 |
| 9,686,276 | B2* | 6/2017 | Grigorovici | H04L 63/0876 |
| 2006/0053123 | A1* | 3/2006 | Ide | G06F 17/30705 |
| 2009/0222243 | A1* | 9/2009 | Zoldi | G06Q 10/04 703/2 |
| 2010/0228625 | A1* | 9/2010 | Priyadarshan | G06Q 30/02 705/14.49 |
| 2011/0099480 | A1* | 4/2011 | Sama | G06F 21/00 715/736 |

(Continued)

OTHER PUBLICATIONS

MIT, "Naive Bayes Classifier", 2014, pp. 1-14, http://responsive.media.mit.edu/wp-content/uploads/sites/5/2014/01/Class-4-Naive-Bayes.pdf (Year: 2014).*

(Continued)

*Primary Examiner* — Izunna Okeke
*Assistant Examiner* — Hee K Song
(74) *Attorney, Agent, or Firm* — Sage Patent Group

(57) ABSTRACT

A historical repository of device identifiers associated with sets of prior mean values and prior standard deviation values, is maintained. A device identification message is received from a suspect computer device and contains a device identifier and a measured device signature value. A mean value and a standard deviation value are determined based thereon, and used to update the prior mean value and the prior standard deviation value in one of the sets in the historical repository having an association to the device identifier. A prior frequency value is determined. A posterior probability value, indicating likelihood that the suspect computer device corresponds to a genuine computer device identified by the device identifier, is generated based on the mean value, the standard deviation value, and the prior frequency value. Whether the suspect computer device is permitted to access an electronic resource is controlled based on the posterior probability value.

20 Claims, 4 Drawing Sheets

(56) References Cited

U.S. PATENT DOCUMENTS

| | | | | |
|---|---|---|---|---|
| 2011/0184867 A1* | 7/2011 | Varadarajan | ............ | G06Q 20/04 |
| | | | | 705/44 |
| 2013/0242795 A1* | 9/2013 | Heen | ................... | H04L 63/1425 |
| | | | | 370/252 |
| 2014/0313983 A1* | 10/2014 | Onno | .................... | H04L 63/105 |
| | | | | 370/328 |
| 2015/0081431 A1* | 3/2015 | Akahoshi | ........... | G06O 30/0254 |
| | | | | 705/14.52 |
| 2015/0282755 A1* | 10/2015 | Deriche | ............... | A61B 5/4094 |
| | | | | 600/301 |
| 2015/0339583 A1* | 11/2015 | McQueen | ............... | H04L 51/12 |
| | | | | 706/12 |
| 2016/0155128 A1* | 6/2016 | Desai et al. | ....... | G06Q 20/4016 |
| | | | | 705/44 |
| 2017/0243223 A1* | 8/2017 | Kolotinsky | ........... | G06F 3/0484 |

OTHER PUBLICATIONS

Finch, "Incremental calculation of weighted mean and variance", Feb. 2009, pp. 1-8, http://people.ds.cam.ac.uk/fanf2/hermes/doc/antiforgery/stats.pdf (Year: 2009).*

* cited by examiner

IDENTIFYING COMPUTER DEVICES BASED ON MACHINE EFFECTIVE SPEED CALIBRATION

BACKGROUND

The present disclosure relates to identifying computer devices, and more particularly to controlling access attempts by multiple computer devices to protected content.

Users can desire to access network accessible content from many different computer devices, such as desktop computers, laptop computers, tablet computers, mobile phones, game consoles, media players, etc. At times, a user may attempt to simultaneously access content from more than one computer device. Typically, the user is permitted by a network accessible content server to have unrestricted access to the content from any computer device after successfully completing authentication of user supplied credentials and determining that the user has authorized access.

Some computer systems attempt to restrict access, such as to documents containing confidential information or copyrighted works, to only authorized users while operating authorized computer devices. The authorized computer devices may be allowed access because they are determined to be more secure by design and/or trusted because of a known relationship to authorized users. Such computer systems need a way to restrict access to content by computer devices having a unique identity. However, fraudsters have developed sophisticated techniques to obtain credentials of users who are authorized to access content. Some of these fraudsters have moreover developed sophisticated techniques to cause computer devices to impersonate authorized computer devices.

Using third party cookies as a way to identify computer devices is being phased out due to privacy concerns and the ability of users to prevent or interfere with their use. Cookieless device identification has therefore become an important goal of operation for some computer systems. Not being able to reliably identify a computer device can create a potential system entry point for users with unauthorized or malicious intent to access or modify services. Techniques for authenticating users using, e.g., one time passwords (OTPs) can be viewed as unacceptably inconvenient by the users. Developing a list of blacklisted devices by one computer system may not be useful to other computer systems, particularly when operated in different system domains, e.g., under ownership of different entities. If computer systems could rely on trusted universal identification for computer devices, at least some of these challenges could be reduced or overcome.

SUMMARY

Some embodiments disclosed herein are directed to a method of performing operations on a processor of a computer device identification node. The method includes maintaining in a memory device a historical repository of device identifiers associated with sets of prior mean values and prior standard deviation values. A device identification message is received from a suspect computer device. The device identification message contains a device identifier and device signature value measured by the suspect computer device. A mean value is determined based on a combination of the device signature value and one of the prior mean values. A standard deviation value is determined based on a combination of the device signature value and one of the prior standard deviation values. The mean value and the standard deviation value are used to update the prior mean value and the prior standard deviation value, respectively, in one of the sets in the historical repository having an association to the device identifier. A prior frequency value is determined based on a ratio of a number of device identification messages containing the device identifier that have been used to update one of the sets of the prior mean values and the prior standard deviation values in the historical repository having the association to the device identifier, to a total number of device identification messages containing any device identifier that have been used to update the sets of the prior mean values and the prior standard deviation values in the historical repository having the association to any of the device identifiers. A posterior probability value, indicating a likelihood that the suspect computer device corresponds to a genuine computer device identified by the device identifier, is generated based on processing a combination of the mean value, the standard deviation value, and the prior frequency value. The method then controls whether the suspect computer device is permitted to access an electronic resource based on the posterior probability value.

Related Some other embodiments disclosed herein are directed to a computer device identification node that includes a network interface circuit, a processor circuit coupled to the network interface, and a memory circuit. The network interface circuit is configured to communicate with computer devices. The memory circuit is coupled to the processor circuit and stores program code which when executed by the processor causes the processor to perform operations. The operations include maintaining in the memory circuit a historical repository of device identifiers associated with sets of prior mean values and prior standard deviation values. A device identification message is received from a suspect computer device. The device identification message contains a device identifier and device signature value measured by the suspect computer device. A mean value is determined based on a combination of the device signature value and one of the prior mean values. A standard deviation value is determined based on a combination of the device signature value and one of the prior standard deviation values. The mean value and the standard deviation value are used to update the prior mean value and the prior standard deviation value, respectively, in one of the sets in the historical repository having an association to the device identifier. A prior frequency value is determined based on a ratio of a number of device identification messages containing the device identifier that have been used to update one of the sets of the prior mean values and the prior standard deviation values in the historical repository having the association to the device identifier, to a total number of device identification messages containing any device identifier that have been used to update the sets of the prior mean values and the prior standard deviation values in the historical repository having the association to any of the device identifiers. A posterior probability value, indicating a likelihood that the suspect computer device corresponds to a genuine computer device identified by the device identifier, is generated based on processing a combination of the mean value, the standard deviation value, and the prior frequency value. The method then controls whether the suspect computer device is permitted to access an electronic resource based on the posterior probability value.

Other methods, computer device identification node, systems, and computer program products according to embodiments will be or become apparent to one with skill in the art upon review of the following drawings and detailed description. It is intended that all such additional methods, computer device identification node, systems, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Various embodiments of the present disclosure are directed to generating posterior probability values based on content of device identification messages received from suspect computer devices. The posterior probability values indicate whether the suspect computer devices corresponds to genuine computer devices which are associated with device identifiers. The posterior probability values are used to control whether the suspect computer devices are permitted access to electronic resources.

Figure 1:
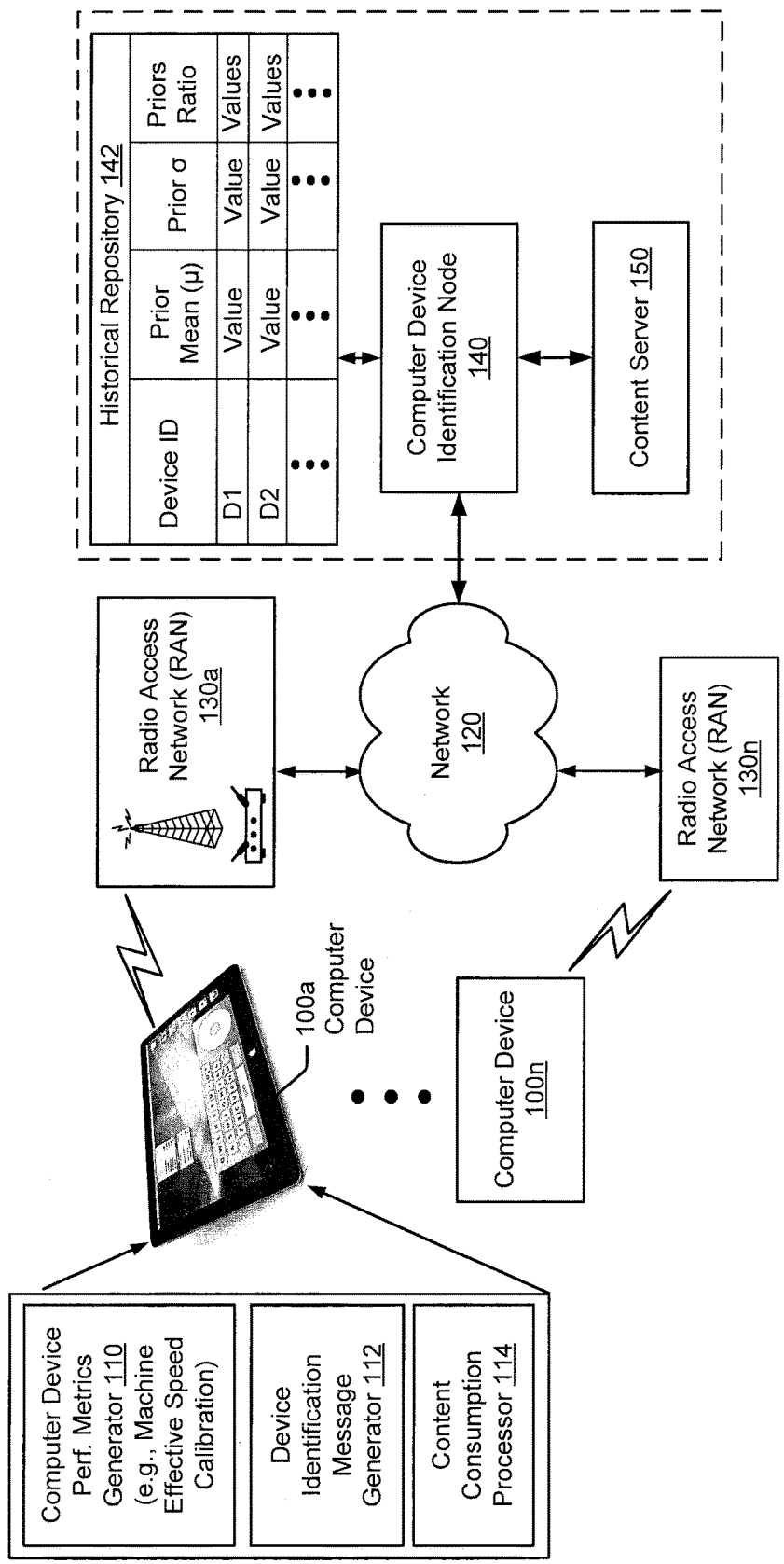
FIG. 1 is a block diagram of a computer device identification node operating in an example system to restrict access to content available through a content server based on posterior probability values indicating whether a suspect computer device corresponds to a genuine computer device associated with a device identifier, in accordance with some embodiments of the present disclosure.

FIG. 1 is a block diagram of a computer device identification node 140 operating in an example system to restrict access to content available through a content server 150 based on posterior probability values indicating whether suspect computer devices 100a-100n correspond to genuine computer devices associated with device identifiers, in accordance with some embodiments of the present disclosure.

Referring to FIG. 1, a user may be able to operate each of the computer devices 100a-100n (individually referred to as computer device 100) to attempt to access content through the content server 150 via one or more radio access networks 130a-130n and a data network 120. At times, the user may operate one or more of the computer devices 100a-100n simultaneously or in tandem to attempt to access the content. The computer device 100 may be any electronic computing device that can communicate through one or more communication networks with the content server 150, including, but not limited to, a desktop computer, a laptop computer, a tablet computer, a mobile phone, a game console, a media player, etc.

In accordance with various embodiments disclosed herein, the content server 150 restricts access to the content to computer devices that have been identified as authentic by a computer device identification node 140. In the example of FIG. 1, the computer device 100 includes a computer device performance metrics generator 110, a device identification message generator 112, and a content consumption processor 114. The generators 110 and 112 may be performed by lightweight code provided by the content server 150 or another provider interface for execution by the computer device 100 during an on-line session to collect and transmit user data and metrics data. A user can supply a user identifier and password to login to the content consumption processor 114 in order to request access to content available through the content server 150. The user identifier may otherwise be determined by the computer device 100 such as using fingerprint authentication operations. The content may reside within the content server 150 and/or may be available through the content server 150 from a content provider (e.g., a streaming video subscription operator) and/or may be reside on the computer device 100 in a locked format.

Responsive to authenticating the user, the content consumption processor 114 triggers the computer device performance metrics generator 110 to measure performance of one or more different types of hardware operational features of the computer device 100 to generate one or more device signature values. The device identification message generator 112 generates a device identification message containing a device identifier and the device signature value(s). In one embodiment, the generator 112 numerically combines a plurality of device signature values measured by the generator 110 to generate a single device signature value that is included in the device identification message. The device identifier may correspond to a media access control (MAC) address.

The device identification message is communicated to the computer device identification node 140, which controls access by the computer device 100 based on the device signature value and the terminal identifier contained in the device identification message.

In one non-limiting illustrative example, the device identification message generator 112 generates a device signature value for the device identification message using Machine Effective Speed Calibration (MESC) operations which estimate the effective processing speed of the computer device 100 to run an Internet browser that processes a defined set of JavaScript code. In one embodiment, the JavaScript code contains a "for loop" which runs for a defined amount of time. The number of iterations of the "for loop" that are completed by processing resources of the computer device 100 during that defined amount of time are then recorded.

Because the number of completed iterations will depend on processor clock rate, processor architecture, memory read/write speed, cache memory read/write speeds, number of cache hierarchical levels, cache management schemes, and bus access speeds, minor variations introduced into each of these computer device components during their fabrication which result in speed differences between any two computer device even their components are manufactured by the same fabrication lines. The number of completed iterations can therefore serve to provide a device signature value that uniquely identifies a computer device 100. For these reasons, the number of iterations completed by an imposter computer device should therefore be different from the number of iterations completed by an authorized computer device 100, although the computer devices are running the same JavaScript code and have identical or similar processing component performance specifications. Consequently, the device signature value measured by an authentic computer device should be different than the device signature value measured by an imposter computer device.

For example, running a MESC JavaScript ten times, each for a time duration of 20 ms, on a computer device D1, can provide the following ten values for the number of iterations completed: 121134, 123432, 124124, 124341, 141023, 143423, 151241, 151412, 159284, and 194232. Each of the completed numbers of iterations could be reported as a device signature value in a separate device identification message. It is observed that the numbers of iterations that are completed are not deterministic. Similarly running the same MESC JavaScript ten times, each for a time duration of 20 ms, on another computer device D2, can provide the following ten values for the number of iterations completed: 151135, 151313, 151351, 151413, 151612, 169128, 181241, 181241, 191212, and 199122.

In one approach the computer device identification node 140 could attempt to provide a deterministic approach to using these device signature values (e.g., MESC values) to identify whether a device identification message containing a MESC value was measured by device D1 or by device D2, by determining the range of MESC values measured by devices D1 and D2 (minimum, maximum) and classifying, any MESC value falling within the range of one of the devices D1 and D2, as coming from that device. In the above example, the range of completed iterations MESC values measured for device D1 is [121134, 194232], while the range of range of completed iterations MESC values measured for device D2 is [151135, 199122]. Accordingly, when a device identification message contains a MESC value of 130010, the computer device identification node 140 would determine therefrom that device D1 sent the message. In contrast, if device identification message contained a MESC value of 196263, the computer device identification node 140 would determine therefrom that device D2 sent the message. However, this approach becomes unacceptably inaccurate when the MESC value contained in a device identification message falls within an overlapping range of the MESC values measured by devices D1 and D2. For example, the identification node 140 may not be able to accurately determine which device sent a device identification message device containing a MESC value of 163456.

Various embodiments of the present invention are therefore directed to the computer device identification node 140 using probabilistic classification operations, which can be based on a Naïve Bayes classifier, to determine a probability based on MESC values or other device signature values received in device identification messages from a suspect computer device, and generate a corresponding likelihood that the suspect computer device corresponds to a genuine computer device identified by a device identifier. A Naïve Bayes classifier can provide potential advantages for this use because of its ease of scaling to hundreds of device signature values that can be received from suspect computer devices and/or hundreds of different classes (or types) of device signature values that can be received.

Although various embodiments herein are described in the context of using MESC values reported by suspect computer devices, these and other embodiments may be more broadly used with any type of device signature value that is measured by a suspect computer device and reported to the computer device identification node 140.

The identification node 140 can perform the Naïve Bayes classifier using a Bayes Rule that operates based on the following equation:

$$\text{Posterior} \propto \text{Likelihood} \times \text{Prior}$$

In terms of computer device classification, the term "Posterior" is the conditional probability of a computer device, given a device signature value (e.g., a single performance measurement value or a combination of MESC values and/or other computer device performance measurements). The term "likelihood" is the conditional probability of a device signature value, given that computer device. The term "Prior" is the probability of the computer device, as seen in the past.

The distribution of MESC values, is however unknown. A normal distribution assumption, can be used to enable the identification node 140 to calculate the likelihood based on the following equation:

$$\text{Likelihood} = e^{-((MESC-\mu)^2/2\sigma^2)}/\sigma\sqrt{(2\pi)}$$

Where the term "MESC" refers to the device signature values measured by the suspect computer device (which can correspond to machine effective speed calibration values in one embodiment), the term "σ" refers to the standard deviation value that is determined, and the term "μ" refers to the mean value that is determined for that device.

In one embodiment the standard deviation value σ is determined by computing a mean of the device signature values, then tracking the mean μ from each of the device signature values and squaring the result to generate squared differences, then determining another mean of the squared differences, and computing the standard deviation value σ based on a square root of the another mean.

A potential advantage of these operations, is that the identification node 140 can operate to only store in memory the mean and standard deviation of MESC values, per computer device, along with the priors, and the likelihood can be computed by a computationally efficient formula. These operations also assign probabilities to values completely outside the range seen for a device.

Figure 2:
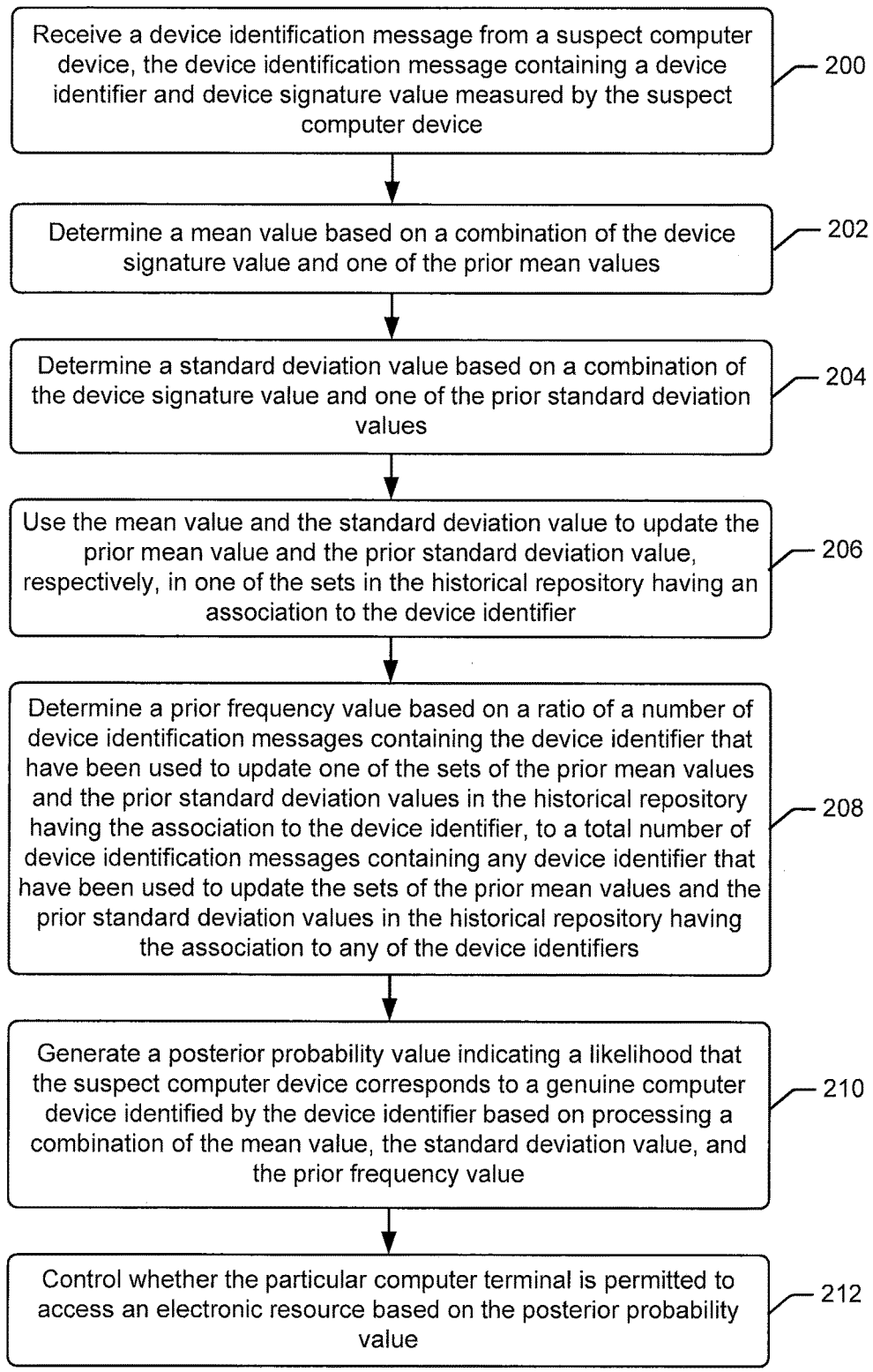
FIGS. 2, 3, and 4 are flowcharts of operations by the computer device identification node that identify a suspect computer device in accordance with some embodiments of the present disclosure.

FIG. 2 illustrates a flowchart of operations by the computer device identification node 140 that identify a suspect computer device in accordance with some embodiments of the present disclosure.

Referring to FIGS. 1 and 2, the identification node 140 maintains in a memory device a historical repository 142 of device identifiers associated with sets of prior mean values μ and prior standard deviation values σ. The identification node 140 receives block 200) a device identification message from a suspect computer device, the device identification message containing a device identifier and device signature value measured by the suspect computer device. The identification node 140 determines (block 202) a mean value based on a combination of the device signature value and one of the prior mean values, and determines (block 204) a standard deviation value based on a combination of the device signature value and one of the prior standard deviation values. The mean value and the standard deviation value are then used (block 206) to update the prior mean value and the prior standard deviation value, respectively, in one of the sets in the historical repository 142 having an association to the device identifier.

The identification node 140 determines (block 208) a prior frequency value based on a ratio of a number of device identification messages containing the device identifier that have been used to update one of the sets of the prior mean values and the prior standard deviation values in the historical repository having the association to the device identifier, to a total number of device identification messages containing any device identifier that have been used to update the sets of the prior mean values and the prior standard deviation values in the historical repository having the association to any of the device identifiers.

A posterior probability value, indicating a likelihood that the suspect computer device corresponds to a genuine computer device identified by the device identifier, is then generated (block 210) based on processing a combination of the mean value, the standard deviation value, and the prior frequency value. The identification node 140 can then control (block 212) whether the suspect computer device is permitted to access an electronic resource based on the posterior probability value. In some embodiments, the identification node 140 performs the "control" operation merely by providing the determined posterior probability value or another score based thereon to the content server 150 for use in its access control decision-making operations.

Figure 3:
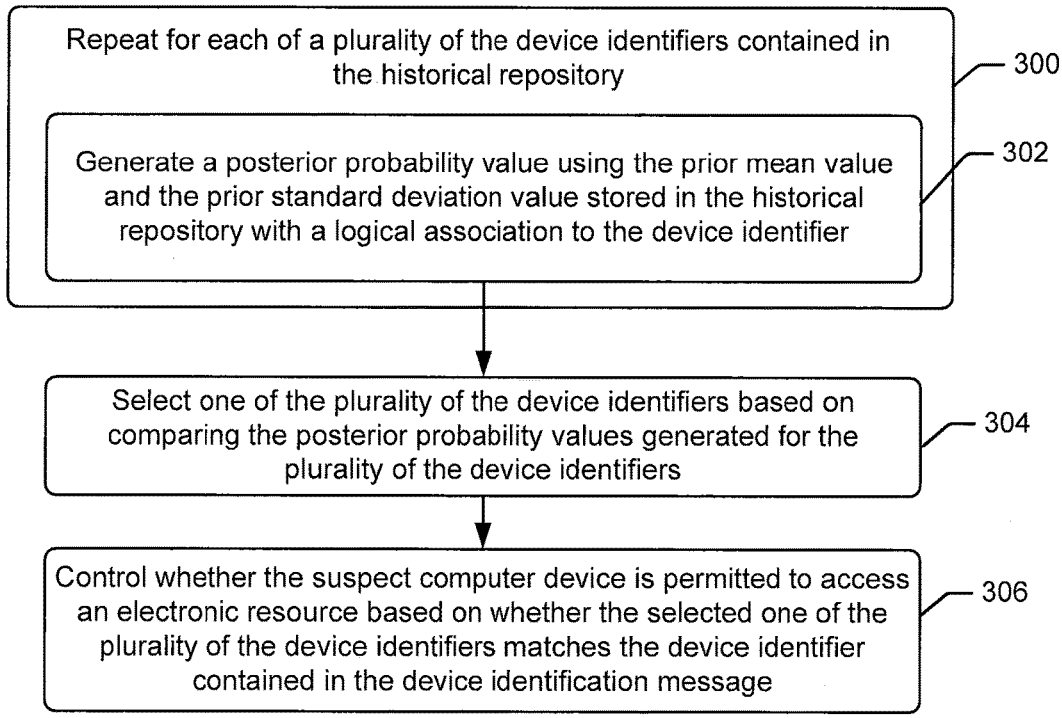

FIG. 3 illustrates a flowchart of further operations by the computer device identification node 140 in accordance with some embodiments of the present disclosure. Referring to FIG. 3, to control whether the suspect computer device is permitted to access an electronic resource based on the posterior probability value, the identification node 140 can repeat (block 300) for each of a plurality of the device identifiers contained in the historical repository, operations to generate (block 302) a posterior probability value using the prior mean value and the prior standard deviation value stored in the historical repository 142 with a logical association to the device identifier.

The identification node 140 can select one of the plurality of the device identifiers based on comparing the posterior probability values generated for the plurality of the device identifiers, and control (block 306) whether the suspect computer device is permitted to access an electronic resource based on whether the selected one of the plurality of the device identifiers matches the device identifier contained in the device identification message.

In some further embodiments, the identification node 140 controls whether the suspect computer device is permitted to access an electronic resource by selectively permitting access by the suspect computer device 100 to the electronic resource responsive to the selected one of the plurality of the device identifiers matching the device identifier contained in the device identification message. In sharp contrast, the identification node 140 denies access by the suspect computer device 100 to the electronic resource responsive to the selected one of the plurality of the device identifiers not matching the device identifier contained in the device identification message.

The identification node 140 may intercept and selectively block a resource request message being communicated from the suspect computer device 100 toward the content server 150. In another embodiment, the identification node may add an indication of the generated posterior pop probability value (e.g., a risk score computed based thereon) to the resource request message from the suspect computer device 100 that is passed through the identification node 140 toward the content server 150.

In one embodiment, for each of a plurality of the device identifiers contained in the historical repository 142, the operations to generate (block 302) a posterior probability value can include generating the posterior probability value based on a ratio of the posterior probability value generated for the device identifier, to a result of summing the posterior probability values generated for the plurality of the device identifiers.

In one embodiment, the operations to select (block 304) one of the plurality of the device identifiers based on comparing the posterior probability values generated for the plurality of the device identifiers, can include selecting one of the plurality of the device identifiers that is logically associated to a largest one of the posterior probability values.

Figure 4:
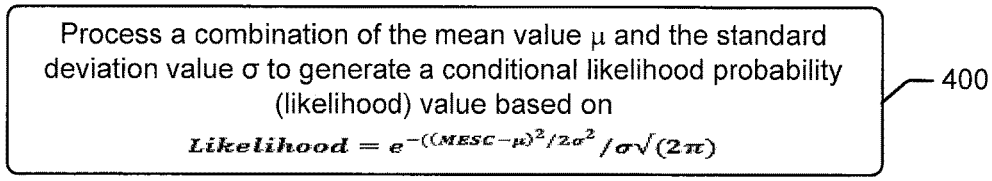

FIG. 4 illustrates a flowchart of further operations by the computer device identification node 140 in accordance with some embodiments of the present disclosure. Referring to FIG. 4, as explained above, the identification node 140 can generate (block 400) a posterior probability value based on processing a combination of the mean value and the standard deviation value to generate a conditional likelihood probability (likelihood) value that the suspect computer device corresponds to the genuine computer device identified by the device identifier contained in the device identification message, based on the following equation:

$$\text{Likelihood} = e^{-((MESC-\mu)^2/2\sigma^2)} / \sigma\sqrt{(2\pi)}$$

where the term MESC refers to the device signature value measured by the suspect computer device, the term $\sigma$ refers to the standard deviation value, and the term $\mu$ refers to the mean value, and wherein the posterior probability value is generated based on multiplying the likelihood value and the prior frequency value.

As explained above, the MESC value can indicate an elapsed time for how long a processor circuit of the suspect computer device 100 took to complete execution of a defined set of operations.

Further non-limiting illustrative operations are now provided by way of example. Assuming historical priors of 0.6 and 0.4 for the first device D1 and the second device D2 respectively. The standard deviation value can be related to a variance value by the square root of the variance value.

The determined mean of the MESC values from the first device D1 is $\mu_1 = 143364.6$, and the determined variance of the MESC values from the first device D1 is $\sigma_1 = 21440.17$.

Similarly, the determined mean of the MESC values from the second device D2 is $\mu_2 = 167876.8$, and the determined variance of the MESC values from the second device D2 is $\sigma_2 = 18008.09$.

The likelihood of the first device D1, given a MESC value of 130010, calculated according to the above formula, with $\mu_1$ and $\sigma_1$ is $\text{Likelihood}_1 = 1.5326175102696078e\text{-}05$. The posterior value for the first device D1 is given by $\text{Posterior}_1 = 9.195705061617647e\text{-}06$.

Regarding the second device D2, the likelihood of the second device D2, given an MESC value of 130010 is $\text{Likelihood}_2 = 2.4282804771428313e\text{-}06$. The posterior value for the second device D2 is given by $\text{Posterior}_2 = 9.713121908571326e\text{-}07$.

The actual probability determined by the identification node 140 for the first device D1 can based on $\text{Posterior}_1/(\text{Posterior}_1 + \text{Posterior}_2)$, and the actual probability assigned by the identification node 140 for the second device D2 can be based on $\text{Posterior}_2/(\text{Posterior}_1 + \text{Posterior}_2)$, which is 0.904 and 0.096 respectively. The identification node 140 predicts that the MESC value is seen from the first device D1 with 90.4% probability. The constant denominator, can be ignored in the Naïve Bayes classifier (i.e., not computed in the operations, but is shown here to compute the final probabilities for clarity of explanation.

When the identification node 140 performs the operations using the MESC value of 196263, it determines the probability of the first device D1 to be 17.2% and the probability of the second device D2 to be 82.8%.

For the ambiguous MESC value of 163456, the identification node 140 determines the probabilities as 45.6 and 54.4 respectively for the first device D1 and the second device D2. These probabilities change according to the prior probability observed. The precision can be improved at the cost of recall, by setting a threshold on the probability for predictions, rather than using the default Maximum a Posteriori (MAP) estimate.

The mean can be stored as a moving average of values. The identification node 140 can store the number of transactions, and the last mean for this approach. The variance, which is the square of the standard deviation value σ, can also be computed incrementally based on the last variance, the number of transactions, and the last mean according to the following equation:

$$\sigma_1^2 = \frac{n\sigma_0^2 + (x_1 - \mu_1)^2 + n(\mu_1 - \mu_0)^2}{n+1}$$

In the equation, the subscript "0" refers to the last stored values, the subscript "1" refers to the current values, and the term "n" refers to a number of device identification messages containing the device identifier that have been previously received. The term $X_1$ refers to the MESC value, or other device signature value received from the suspect computer device 100. The current mean ($\mu_1$) can be determined by adding the current MESC value ($X_1$) to the total of previous MESC values and dividing the number (n) of MESC values that have been determined.

Before determining the mean value and determining the standard deviation value, the identification node 140 can operate to round the device signature value to a closest one of a plurality of defined binning values.

The priors per computer device can be updated based on a Double Exponential Weighted Moving Average (DEWMA) with a defined fixed window size, which can be defined based on iterative performance based tuning of the operations disclosed herein by the identification node 140 to satisfy a defined rule for accuracy of the generated likelihood that a suspect computer device 100 corresponds to a genuine computer device.

However, the distribution is not always normal. It is noted that in one study leading to the present disclosure that data was collected from 230 devices, out of which, a Kolmogorov Smirnov test, rejected the null hypothesis, that the distribution follows a normal distribution, in 130 out of the 230 odd devices. The precision, and recall, with this normality assumption, is however, 52% each, with MESC values alone. When combined with other device signature values, these operations, yielded a very accurate precision and recall of over 99%.

In one embodiment, the identification node 140 uses (block 206) the mean value and the standard deviation value to update the prior mean value and the prior standard deviation value, respectively, based on determining a moving average mean value based on the mean value and the prior mean value in the one of the sets in the historical repository having an association to the device identifier, and updating the prior mean value with the moving average mean. In a further embodiment, determination of the moving average mean value and the prior mean value can include determining the moving average mean value based on a combination of the mean value and the prior mean value and based on a number of device identification messages containing the device identifier that have been previously received.

In another embodiment, the identification node 140 uses (block 206) the mean value and the standard deviation value to update the prior mean value and the prior standard deviation value, respectively, based on determining a moving average standard deviation value based on the standard deviation value and prior standard deviation value in the one of the sets in the historical repository having an association to the device identifier, and updating the prior standard deviation value with the moving average standard deviation value.

The Probability Density Function (PDF) of MESC values per computer device, can be better approximated by the identification node 140 binning the MESC values. This requires no normality assumption, and is more reliable. However, these operations may use a large number of transactions per computer device to provide improved accuracy. For example, assuming a bin size of 5, which includes a bin below the minimum MESC value seen for a computer device, and a bin, above the maximum value. So for the first device D1, the bins are [0, 121133], [121134, 145549], [145550, 169865], [169866, 194231], [194232, ∞). The corresponding frequency probability distribution for the bins is −0.0, 0.6, 0.3, 0.1, 0.0.

The bins for the second device D2 are [0, 151134], [151135, 167129], [167130, 183124], [183125, 199119], [199120, ∞). The corresponding probability distribution for the bins is −0.0, 0.5, 0.3, 0.1, 0.1.

For finding the likelihood of device D1 for the value 130010, the identification node 140 first identifies the bin, which happens to be the $2^{nd}$ bin. The probability of this bin is 0.6, which is set to the likelihood of device D1. The posterior is then, determined as 0.6×0.6=0.36.

Similarly, the likelihood of D2, given the MESC value of 130010 is determined to be 0.0. The posterior also reduces to 0.

The actual probability, determined by the identification node 140 for the first device D1 is $Posterior_1/(Posterior_1 + Posterior_2)$, is 1.0 and for the second device D2 is $Posterior_2/(Posterior_1 + Posterior_2)$ is 0.0.

Doing the calculations similarly to the input value of 1962632, the identification node 140 determines the probability of the first device D1 to be 0% and the probability of the second device D2 to be 100%.

For the ambiguous value of 163456, the identification node 140 determines the probabilities 23.08% and 76.92% for the first device D1 and the second device D2 respectively.

As the number of bins increases to infinity, the estimation of the PDF will equal the true PDF of the MESC values. Practically however, there are some limitations arising the computational resources, storage resources, and elapsed time for the identification node 140 to perform the associated operations. For example, the memory space required to store the probabilities per bin can become excessive when the number of bins is large. Secondly, more bins requires more data. Otherwise, the probability of a large number of bins, would be zeroed out, based on the Pigeon Hole Principle. The latter problem, can be corrected by a nearest neighbor smoothing algorithm, but the space complexity problem, is difficult to solve.

Trying this approach with the number of bins equal to 10, 16, 25, 100 and 1000, it was determined that with 16 bins, the precision and recall was 56% each, which was higher than the normality assumption, and at the same time, more reliable, as no strong assumption was required in this case. When combined with the other fingerprints, the precision and recall was over 99.9%. The precision was the worst, however, with 1000 bins, but this was due to the absence of any smoothing correction. The optimal value of the bin sizes can be found during the training phase. Also, better binning techniques can be used, over the simplest uniform binning.

As explained above, a computer device 100 can measure MESC and/or other performance metrics relating to its operation, and generate one or more device signature values for inclusion in the device identification message sent to the computer device identification node 140. The device identification message can furthermore include a device identifier which may correspond to a MAC address or other identifier that has been defined or determined for the computer device 100.

Figure 5:
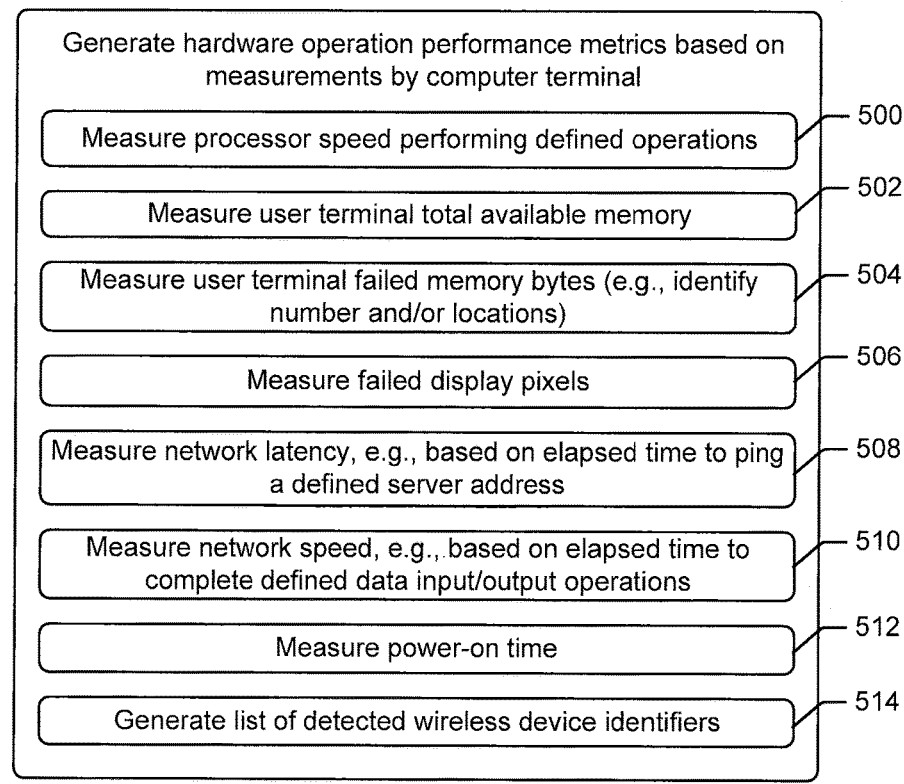
FIG. 5 is a flowchart of operations by a computer device to generate a device identification message in accordance with some embodiments of the present disclosure.

FIG. 5 is a flowchart of operations by a computer device 100 to generate a device identification message in accordance with some embodiments of the present disclosure. Referring to FIG. 5, the computer device 100 generates hardware operational performance metrics based on measurements by the computer device 100. One or more of the illustrated operations may be performed to generate one or more device signature values based on the hardware operational performance metrics for inclusion in the device identification message sent to the computer device identification node 140.

The computer device 100 can generate a device signature value based on measuring (block 500) processing speed of the computer device 100 while performing defined operations, such as the above described MESC operations. In one embodiment, the computer device 100 measures an elapsed time for a processor of the computer device 100 to complete execution of a defined set of operations, and generates the device signature value based on the elapsed time. Because the elapsed time will depend on processor clock rate, processor architecture, memory read/write speed, and bus access speeds, minor variations introduced into each of these computer device components during their fabrication which result in speed differences between any two processing platforms even when manufactured from the same component fabrication lines. The elapsed time determined by an imitation computer device should therefore be different from the elapsed time determined by an authentic computer device 100. Consequently, the device signature value generated by the imitation and the authorized computer devices based on their separate measurements of the elapsed time should be different.

The computer device 100 may generate a device signature value based on measuring (block 502) the total available memory in the computer device 100. The computer device 100 may generate the device signature value based on measuring (block 504) the number of failed memory bytes in a memory of the computer device 100. Thus, for example, an application executed by the computer device 100 may identify failed memory bytes and count the number of failed memory bytes, or may obtain that count from another circuit or application. Because the number of failed memory bytes in a memory of the imitation computer device should be different from the number of failed memory bytes in a memory of the authentic computer device 100, the device signature value generated by the imitation and the authorized computer devices based on their separate determinations of the number of failed memory bytes should be different.

The computer device 100 may generate the device signature value based on measuring (block 506) the number of failed display pixels in a display device of the computer device 100. Because the number of failed display pixels in a display device of the imitation computer device will likely be different from the number of failed display pixels in a display device of the authentic computer device 100, the device signature value generated by the imitation and the authorized computer devices based on their separate measurements of the number of failed display pixels should be different.

The computer device 100 may generate the device signature value based on determining (block 508) network latency, which may be determined based on measuring network communication latency for a communication between the computer device 100 and a defined server address through the data network 120. In one embodiment, the computer device 100 measures an elapsed time between communicating a ping request to a network server and receiving a ping response from the network server, and then generates the device signature value based on the elapsed time. Because the physical distance over which the message propagates from the computer device 100 to the network server and the number of forwarding nodes in the network between the computer device 100 to the network server will be different for the message from an imitation computer device compared to the message from the authentic computer device 100, the device signature value generated by the imitation and the authorized computer devices based on their separate measurements of the elapsed time should be different.

The computer device 100 may generate the device signature value based on measuring (block 510) network speed, which may be determined based on measuring elapsed time to complete a defined data input and/or output operations with a defined network server through the data network 120. Again, because the physical distance over which the data propagates between the computer device 100 and the network server and the number of forwarding nodes in the network will be different for the data input/output with the imitation computer device compared to the data input/output with the authentic computer device 100, the device signature value generated by the imitation and the authorized computer devices based on their separate measurements of the network speed should be different.

The computer device 100 may generate the device signature value based on measuring (block 512) a tracked total operational power-on time since initialization of the computer device 100. Again, the operational performance metric generated by a imitation computer device based on tracked total operational power-on time should be different and, consequently, the resulting device signature value generated therefrom should be different from what is generated for the authentic computer device 100.

The computer device 100 may generate the device signature value based on generating (block 514) a list of wireless terminal identifiers of wireless devices that are detectable by the computer device 100 through one or more wireless transceiver interfaces of the computer device 100. The list may include wireless terminal identifiers of wireless devices that are observable through any type of wireless communication technology by the computer device 100. In one example embodiment, the list of wireless terminal identifiers can include a list of Bluetooth devices that indicated to have established a traffic data connection through completing pairing to the computer device 100, but alternatively or additionally the list can include Bluetooth devices that are not paired to the computer device 100 but are presently observed to be within communication range of a Bluetooth transceiver of the computer device 100 through operations for discovering Bluetooth devices. In another example embodiment, the list of wireless terminal identifiers can include a list of wireless local area network, WLAN, (e.g., WIFI) devices that are indicated to have established a traffic data connection with the computer device 100 through joining a shared network that includes the computer device 100 (e.g., WIFI shared network or WIFI Direct), but alternatively or additionally the list can include WLAN devices that are not connected to the computer device 100 but which have been discovered to be within communication range of a WLAN transceiver of the computer device 100 through operations for discovering WLAN routers and other devices. Because the lists of wireless terminal identifiers detected by the authentic computer device 100 (e.g., within the authorized user's home or office) will likely be different from the wireless terminal identifiers detected by an imitation computer device, the device signature values generated therefrom should be different between the computer devices.

Figure 6:
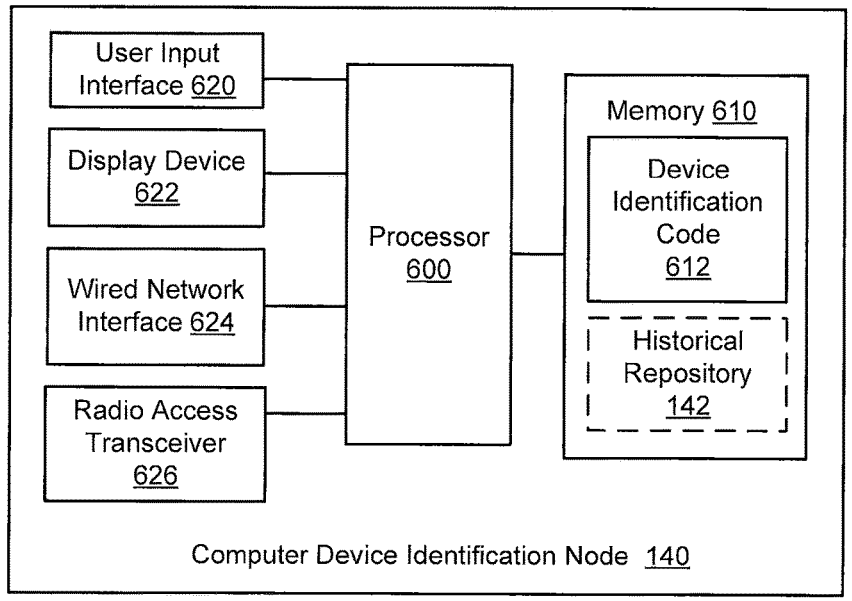
FIG. 6 is a block diagram of a content server configured according to some embodiments of the present disclosure.

FIG. 6 is a block diagram of a computer device identification node 140 configured according to some embodiments of the present disclosure. The identification node 140 includes a processor 600, a memory 610, and a network interface circuit which may include a radio access transceiver 626 and/or a wired network interface 624 (e.g., Ethernet interface). The radio access transceiver 626 can include, but is not limited to, a LTE or other cellular transceiver, WIFI transceiver (IEEE 802.11), Bluetooth, WiMax transceiver, or other radio communication transceiver configured to communicate with computer devices 100 via the radio access network(s) 130.

The processor 600 may include one or more data processing circuits, such as a general purpose and/or special purpose processor (e.g., microprocessor and/or digital signal processor) that may be collocated or distributed across one or more networks. The processor 600 is configured to execute device identification computer program code in the memory 610, described below as a non-transitory computer readable medium, to perform at least some of the operations described herein as being performed by an identification node 140. The memory 610 may further include the historical repository 142. The identification node 140 may further include a user input interface 620 (e.g., touch screen, keyboard, keypad, etc.) and a display device 622.

Although various embodiments of the identification node 140 have been shown as being separate from the content server 150 and from the computer device 100, in some other embodiments some or all of the operations disclosed herein as being performed by the identification node 140 may be included in and performed by the content server 150 and/or may be included in and performed by the computer device 100.

The identification node 140 may control access by computer devices 100 to electronic resources that can include, but are not limited to, application program code, digital video, digital audio, digital pictures, user information, webpage information, etc., which may reside in or otherwise be accessible through the content server 150.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of performing operations on a processor of a computer device identification node, the method comprising:
   maintaining in a memory device a historical repository of device identifiers associated with sets of prior mean values and prior standard deviation values;
   receiving a device identification message from a suspect computer device, the device identification message containing a device identifier and a device signature value measured by the suspect computer device, wherein the device signature value measured by the suspect computer device comprises a machine effective speed calibration value that indicates how long the suspect computer device took to perform calibration test operations;
   determining a mean value based on a combination of the device signature value and one of the prior mean values;
   determining a standard deviation value based on a combination of the device signature value and one of the prior standard deviation values;
   using the mean value and the standard deviation value to update the prior mean value and the prior standard deviation value, respectively, in one of the sets in the historical repository having an association to the device identifier;
   determining a prior frequency value based on a ratio of a number of device identification messages containing the device identifier that have been used to update one of the sets of the prior mean values and the prior standard deviation values in the historical repository having the association to the device identifier, to a total number of device identification messages containing any device identifier that have been used to update the sets of the prior mean values and the prior standard deviation values in the historical repository having the association to any of the device identifiers;
   generating a posterior probability value indicating a likelihood that the suspect computer device corresponds to a genuine computer device identified by the device identifier based on processing a combination of the mean value, the standard deviation value, and the prior frequency value; and controlling whether the suspect computer device is permitted to access an electronic resource based on the posterior probability value.

2. The method of claim 1, wherein the controlling whether the suspect computer device is permitted to access an electronic resource based on the posterior probability value, comprises:

for each of a plurality of the device identifiers contained in the historical repository, generating a posterior probability value using the prior mean value and the prior standard deviation value stored in the historical repository with a logical association to the device identifier;

selecting one of the plurality of the device identifiers based on comparing the posterior probability values generated for the plurality of the device identifiers; and controlling whether the suspect computer device is permitted to access an electronic resource based on whether the selected one of the plurality of the device identifiers matches the device identifier contained in the device identification message.

3. The method of claim 2, wherein the controlling whether the suspect computer device is permitted to access an electronic resource based on whether the selected one of the plurality of the device identifiers matches the device identifier contained in the device identification message, comprises:

permitting access by the suspect computer device to the electronic resource responsive to the selected one of the plurality of the device identifiers matching the device identifier contained in the device identification message; and denying access by the suspect computer device to the electronic resource responsive to the selected one of the plurality of the device identifiers not matching the device identifier contained in the device identification message.

4. The method of claim 2, wherein for each of a plurality of the device identifiers contained in the historical repository, the generating a posterior probability value using the prior mean value and the prior standard deviation value stored in the historical repository with a logical association to the device identifier, further comprises:

generating the posterior probability value based on a ratio of the posterior probability value generated for the device identifier, to a result of summing the posterior probability values generated for the plurality of the device identifiers.

5. The method of claim 2, wherein the selecting one of the plurality of the device identifiers based on comparing the posterior probability values generated for the plurality of the device identifiers, comprises:

selecting one of the plurality of the device identifiers that is logically associated to a largest one of the posterior probability values.

6. The method of claim 1, wherein the generating a posterior probability value indicating a likelihood that the suspect computer device corresponds to a genuine computer device identified by the device identifier based on processing a combination of the mean value, the standard deviation value, and the prior frequency value, comprises:

processing a combination of the mean value and the standard deviation value to generate a conditional likelihood probability (likelihood) value that the suspect computer device corresponds to the genuine computer device identified by the device identifier contained in the device identification message, based on the following equation:

$$\text{Likelihood} = e^{-((MESC-\mu)^2/2\sigma^2)}/\sigma\sqrt{(2\pi)}$$

wherein the term MESC refers to the device signature value measured by the suspect computer device, the term σ refers to the standard deviation value, and the term μ refers to the mean value, and wherein the posterior probability value is generated based on multiplying the likelihood value and the prior frequency value.

7. The method of claim 6, wherein the term MESC refers to the machine effective speed calibration value measured by the suspect computer device and provided as the device signature value contained in the device identification message.

8. The method of claim 1, wherein the calibration test operations comprise a defined set of operations and the machine effective speed calibration value comprises an elapsed time indicating how long a processor circuit of the suspect computer device took to complete execution of the defined set of operations.

9. The method of claim 7, wherein the controlling whether the suspect computer device is permitted to access an electronic resource based on the posterior probability value, comprises:

for each of a plurality of the device identifiers contained in the historical repository, generating a posterior probability value using the prior mean value and the prior standard deviation value stored in the historical repository with a logical association to the device identifier;

selecting one of the plurality of the device identifiers based on comparing the posterior probability values generated for the plurality of the device identifiers; and controlling whether the suspect computer device is permitted to access an electronic resource based on whether the selected one of the plurality of the device identifiers matches the device identifier contained in the device identification message.

10. The method of claim 9, wherein the selecting one of the plurality of the device identifiers based on comparing the posterior probability values generated for the plurality of the device identifiers, comprises:

selecting one of the plurality of the device identifiers that is logically associated to a largest one of the posterior probability values.

11. The method of claim 1, wherein the using the mean value and the standard deviation value to update the prior mean value and the prior standard deviation value, respectively, in one of the sets in the historical repository having an association to the device identifier, comprises:

determining a moving average mean value based on the mean value and the prior mean value in the one of the sets in the historical repository having an association to the device identifier; and updating the prior mean value with the moving average mean.

12. The method of claim 11, wherein the determining a moving average mean value based on the mean value and the prior mean value in the one of the sets in the historical repository having an association to the device identifier, comprises:

determining the moving average mean value based on a combination of the mean value and the prior mean value and based on a number of device identification messages containing the device identifier that have been previously received.

13. The method of claim 1, wherein the using the mean value and the standard deviation value to update the prior mean value and the prior standard deviation value, respectively, in one of the sets in the historical repository having an association to the device identifier, comprises:
   determining a moving average standard deviation value based on the standard deviation value and prior standard deviation value in the one of the sets in the historical repository having an association to the device identifier; and
   updating the prior standard deviation value with the moving average standard deviation value.

14. The method of claim 13, wherein the determining a moving average standard deviation value based on the standard deviation value and prior standard deviation value in the one of the sets in the historical repository having an association to the device identifier, comprises:
   determining the moving average standard deviation value based on a square root of a term $\sigma^2_1$ in the following equation:

$$\sigma^2_1 = \frac{n\sigma^2_0 + (x_1 - \mu_1)^2 + n(\mu_1 - \mu_0)^2}{n+1}$$

wherein the term $\sigma_0$ refers to the prior standard deviation value in the historical repository having an association to the device identifier, the term $\sigma_1$ refers to the standard deviation value, the term $\mu_0$ refers to the prior mean value in the historical repository having an association to the device identifier, the term $\mu_1$ refers to the mean value, the term "n" refers to a number of device identification messages containing the device identifier that have been previously received, the term $X_1$ refers to the device signature value.

15. The method of claim 1, further comprising:
   before determining the mean value and determining the standard deviation value, rounding device signature value to a closest one of a plurality of defined binning values.

16. A computer device identification node comprising:
   a network interface circuit configured to communicate with computer devices;
   a processor circuit coupled to the network interface; and
   a memory circuit coupled to the processor circuit and storing program code which when executed by the processor causes the processor to perform operations comprising:
      maintaining in the memory circuit a historical repository of device identifiers associated with sets of prior mean values and prior standard deviation values;
      receiving a device identification message from a suspect computer device, the device identification message containing a device identifier and a device signature value measured by the suspect computer, wherein the device signature value measured by the suspect computer device comprises a machine effective speed calibration value that indicates how long the suspect computer device took to perform calibration test operations;
      determining a mean value based on a combination of the device signature value and one of the prior mean values;
      determining a standard deviation value based on a combination of the device signature value and one of the prior standard deviation values;
      using the mean value and the standard deviation value to update the prior mean value and the prior standard deviation value, respectively, in one of the sets in the historical repository having an association to the device identifier;
      determining a prior frequency value based on a ratio of a number of device identification messages containing the device identifier that have been used to update one of the sets of the prior mean values and the prior standard deviation values in the historical repository having the association to the device identifier, to a total number of device identification messages containing any device identifier that have been used to update the sets of the prior mean values and the prior standard deviation values in the historical repository having the association to any of the device identifiers;
      generating a posterior probability value indicating a likelihood that the suspect computer device corresponds to a genuine computer device identified by the device identifier based on processing a combination of the mean value, the standard deviation value, and the prior frequency value; and
      controlling whether the suspect computer device is permitted to access an electronic resource based on the posterior probability value.

17. The computer device identification node of claim 16, wherein the controlling whether the suspect computer device is permitted to access an electronic resource based on the posterior probability value, comprises:
   for each of a plurality of the device identifiers contained in the historical repository, generating a posterior probability value using the prior mean value and the prior standard deviation value stored in the historical repository with a logical association to the device identifier;
   selecting one of the plurality of the device identifiers based on comparing the posterior probability values generated for the plurality of the device identifiers; and
   controlling whether the suspect computer device is permitted to access an electronic resource based on whether the selected one of the plurality of the device identifiers matches the device identifier contained in the device identification message.

18. The computer device identification node of claim 16, wherein the generating a posterior probability value indicating a likelihood that the suspect computer device corresponds to a genuine computer device identified by the device identifier based on processing a combination of the mean value, the standard deviation value, and the prior frequency value, comprises:
   processing a combination of the mean value and the standard deviation value to generate a conditional likelihood probability (likelihood) value that the suspect computer device corresponds to the genuine computer device identified by the device identifier contained in the device identification message, based on the following equation:

$$\text{Likelihood} = e^{-((MESC-\mu)^2/2\sigma^2)}/\sigma\sqrt{(2\pi)}$$

wherein the term MESC refers to the device signature value measured by the suspect computer device, the term $\sigma$ refers to the standard deviation value, and the term $\mu$ refers to the mean value, and wherein the posterior probability value is generated based on multiplying the likelihood value and the prior frequency value.

19. The computer device identification node of claim 18, wherein the controlling whether the suspect computer device is permitted to access an electronic resource based on the posterior probability value, comprises:
  for each of a plurality of the device identifiers contained in the historical repository, generating a posterior probability value using the prior mean value and the prior standard deviation value stored in the historical repository with a logical association to the device identifier;
  selecting one of the plurality of the device identifiers based on comparing the posterior probability values generated for the plurality of the device identifiers; and
  controlling whether the suspect computer device is permitted to access an electronic resource based on whether the selected one of the plurality of the device identifiers matches the device identifier contained in the device identification message.

20. The computer device identification node of claim 16, wherein:
  the using the mean value and the standard deviation value to update the prior mean value and the prior standard deviation value, respectively, in one of the sets in the historical repository having an association to the device identifier, comprises:
    determining a moving average mean value based on the mean value and the prior mean value in the one of the sets in the historical repository having an association to the device identifier; and
    updating the prior mean value with the moving average mean; and
  the using the mean value and the standard deviation value to update the prior mean value and the prior standard deviation value, respectively, in one of the sets in the historical repository having an association to the device identifier, comprises:
    determining a moving average standard deviation value based on the standard deviation value and prior standard deviation value in the one of the sets in the historical repository having an association to the device identifier; and
    updating the prior standard deviation value with the moving average standard deviation value.

\* \* \* \* \*